No. 624,727. Patented May 9, 1899.
G. A. ANDERSON.
SPRING WHEEL.
(Application filed Sept. 27, 1898.)
(No Model.) 2 Sheets—Sheet 1.

WITNESSES
J. Smgg Poole
F. W. Bond

INVENTOR
Gustaf A. Anderson
by Herbert W. T. Jenner
Attorney

No. 624,727. Patented May 9, 1899.
G. A. ANDERSON.
SPRING WHEEL.
(Application filed Sept. 27, 1898.)

(No Model.) 2 Sheets—Sheet 2.

WITNESSES
J. Sprigg Poole
H. W. Bond

INVENTOR
Gustaf A. Anderson.
by Herbert W. T. Jenner.
Attorney

THE NORRIS PETERS CO., PHOTO-LITHO., WASHINGTON, D. C.

UNITED STATES PATENT OFFICE.

GUSTAF ARVID ANDERSON, OF WAYNESBOROUGH, PENNSYLVANIA, ASSIGNOR TO THE GEISER MANUFACTURING COMPANY, OF SAME PLACE.

SPRING-WHEEL.

SPECIFICATION forming part of Letters Patent No. 624,727, dated May 9, 1899.

Application filed September 27, 1898. Serial No. 692,027. (No model.)

*To all whom it may concern:*

Be it known that I, GUSTAF ARVID ANDERSON, a citizen of the United States, residing at Waynesborough, in the county of Franklin and State of Pennsylvania, have invented certain new and useful Improvements in Spring-Wheels; and I do hereby declare the following to be a full, clear, and exact description of the invention, such as will enable others skilled in the art to which it appertains to make and use the same.

This invention relates to spring-wheels for traction-engines and other vehicles; and it consists in the novel construction and combination of the parts hereinafter fully described and claimed.

Figure 1:
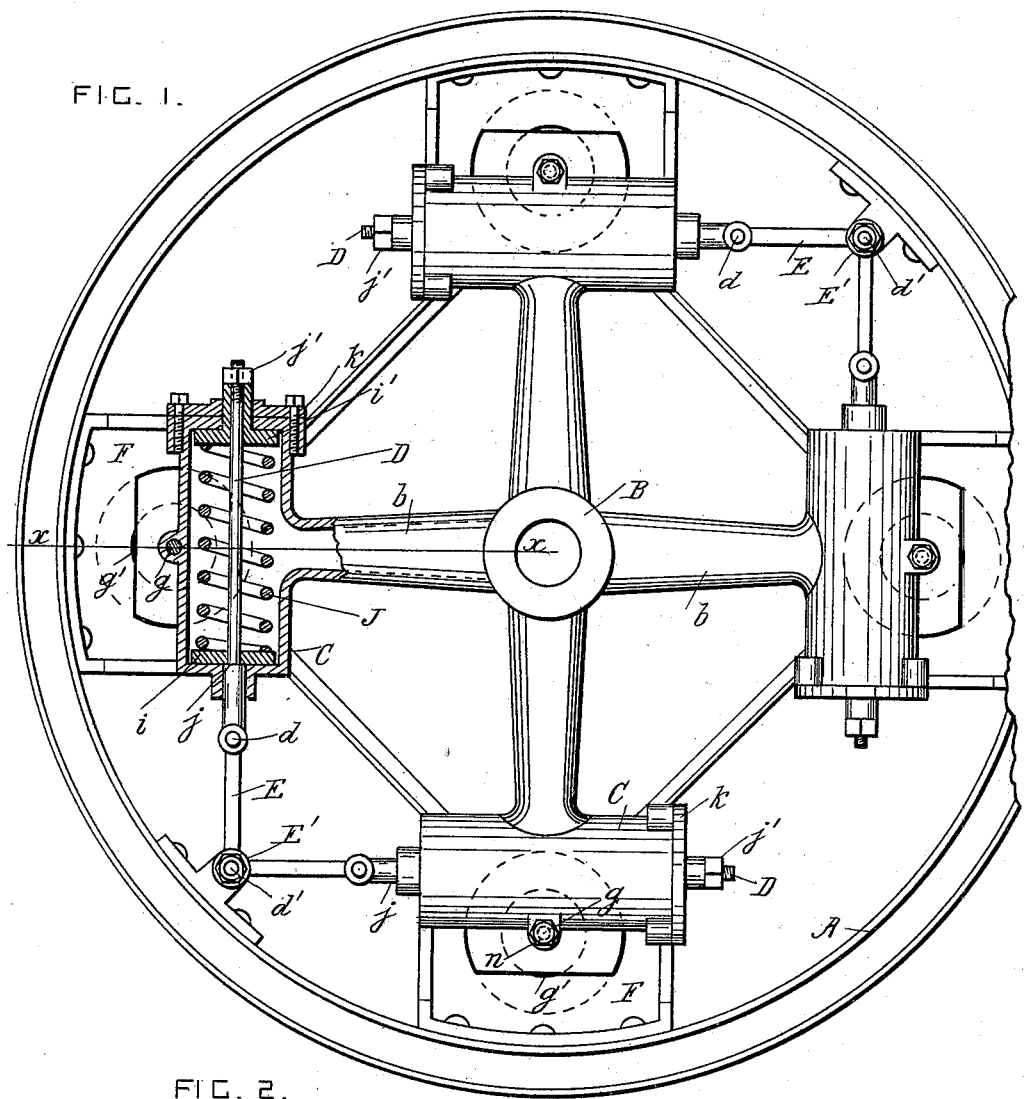
Figure 2:
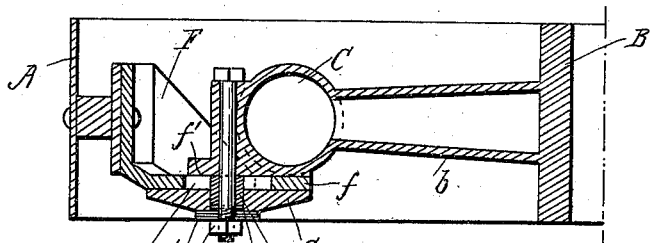
Figure 3:
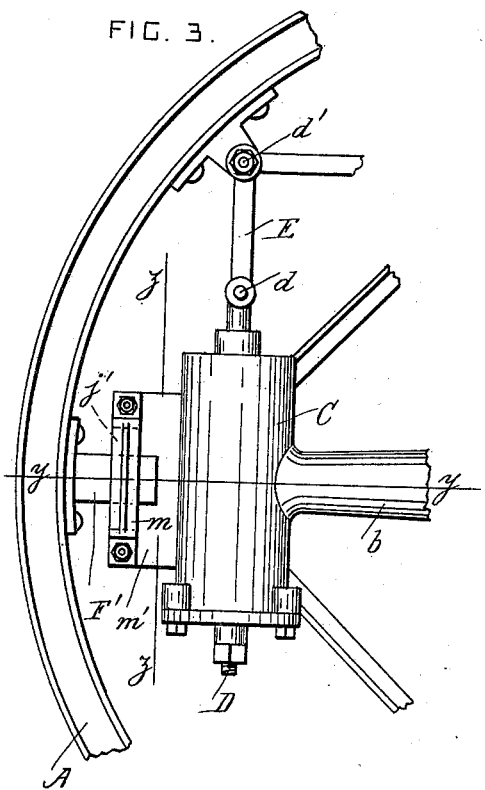
Figure 6:
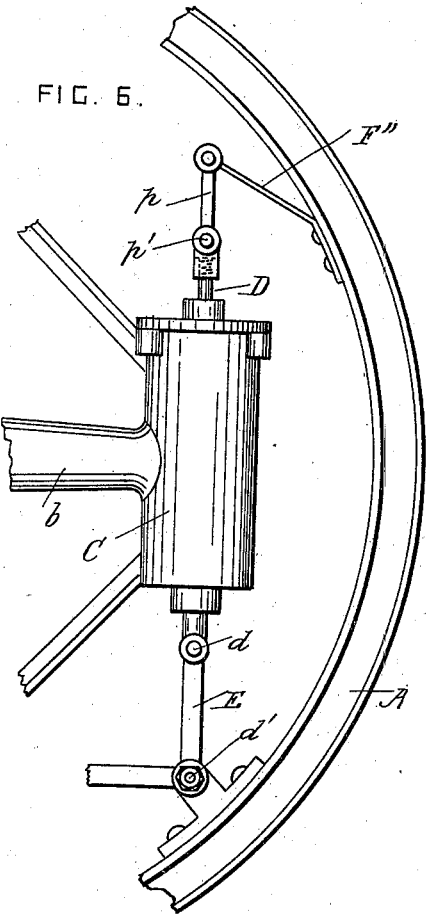
Figure 4:
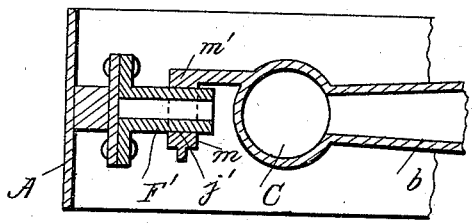
Figure 5:
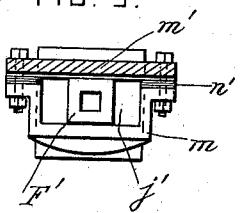

In the drawings, Figure 1 is a side view of a wheel, partly in section. Fig. 2 is a cross-section taken on the line $xx$ in Fig. 1. Fig. 3 is a side view of a part of a wheel, showing a modification. Fig. 4 is a cross-section taken on the line $yy$ in Fig. 3. Fig. 5 is a cross-section on line $zz$ of Fig. 3. Fig. 6 is a side view of a part of a wheel, showing another modification.

A is the rim of the wheel, and B is the hub, which is mounted on a shaft in any approved manner. The hub is provided with a framework consisting of arms $b$, which carry frames or cylinders C, four cylinders being preferably used and arranged equidistant from the hub and from each other. The axis of each frame or cylinder is arranged at an angle to the rim, and the axis of each cylinder, when four are used, is preferably parallel to the axis of the cylinder on the opposite side of the hub and at right angles to the axes of the adjacent or intervening cylinders. The framework is preferably formed integral with the hub.

D are bolts which are arranged upon the axes of the cylinders.

E are links which are pivoted to the bolts D by pins $d$ and to brackets E', secured to the rim, by pins $d'$. The links and bolts are arranged in line with each other and at an angle to the rim of the wheel. The links are arranged in pairs, and the links of each pair diverge in opposite directions and are preferably pivotally connected with the rim by a single pin $d'$.

F are guides secured to the rim and operating to prevent the rim and the framework from having any relative motion crosswise of each other, but permitting them to move relatively in any direction in the plane in which the wheel revolves.

When the guides F consist of brackets, as shown in Figs. 1 and 2, each guide-bracket has a plate $f$ arranged edgewise in the plane in which the wheel revolves, and each frame C has a bearing $f'$, which works against one side of the plate $f$. G is a plate which works against the other side of the plate $f$, and $g$ is a bolt which connects the plate G with the frame C. The plate $f$ has a large hole $g'$, in which the bolt $g$ can move freely, and $h$ is a distance-piece which is mounted on the bolt $g$ and which engages with a hole in the plate $f$. H is a washer outside the plate G, and $h'$ are thin plates between the distance-piece and washer. A nut $n$ on the end of the bolt holds the said parts in position. When the plate $f$ and the parts working against it become worn, some of the thin plates $f'$ are removed and the nut is screwed up farther on the bolt, so as to set up the worn parts.

Two plates $i$ and $i'$ are mounted on each bolt D and are normally slidable toward each other. Each bolt D is provided with a collar or shoulder $j$, which prevents the plate $i$ from moving too far away from the plate $i'$, and $j'$ is a nut on the end of the bolt, which prevents the plate $i'$ from moving too far away from the plate $i$. The plates $i$ and $i'$ normally abut against portions of the framework, and when cylinders C are used one plate bears against its bottom and the other against its cover $k$.

J is a helical spring which is arranged in the frame or cylinder C between the plates $i$ and $i'$, and this spring is preferably confined under a prearranged initial tension. The springs J are always in compression irrespective of the direction of the revolution of the wheel, and they both support the constant load and transmit the driving strains.

In the modification shown in Figs. 3 and 4 the guides consist of arms or brackets F', secured to the rim of the wheel. These arms F' engage with elongated holes $j'$ in the framework, which permit them to move longitudinally, but not laterally. The holes or openings $j'$ are preferably formed by means of keep-plates $m$, which are bolted against lugs $m'$ on the cylinders C. Thin plates $n'$ are interposed between the plates $m$ and lugs $m'$, so that when the said parts and the arms become worn some of the thin plates can be removed and the parts can be set up.

In the modification shown in Fig. 6 the guides consist of spring-bars $F''$, secured at one end to the wheel-rim and arranged at an acute angle to the bolts D. These spring-bars are pivotally connected to the other ends of the bolts D from the links E by links $p$, having eyes $p'$. The spring-bars and links $p$ permit the frame and rim to have relative motion in the plane in which the wheel revolves and prevent them from having relative motion laterally.

What I claim is—

1. In a spring-wheel, the combination, with a rim, and a framework provided with a hub; of guides which restrain the said rim and framework from having relative motion except in the plane in which the wheel revolves, helical springs supported by the said framework and arranged at an angle to the rim, and connections bearing against the opposite ends of the said springs and pivotally connected with the rim, substantially as set forth.

2. In a spring-wheel, the combination, with a rim, and a framework provided with a hub; of guides carried by the said rim and engaging slidably with bearing-surfaces on the said framework, said guides operating to prevent the framework from moving laterally but permitting it to move in the plane in which the wheel revolves, means for setting up the contiguous guide-surfaces as they become worn, and helical springs operating in both directions and continually connecting the said framework and rim, substantially as set forth.

3. In a spring-wheel, the combination, with a rim, and a framework provided with a hub; of guides which permit the said rim and framework to have relative motion in the plane in which the wheel revolves and which prevent them from having relative motion laterally, links having their adjacent end portions pivoted to the said rim and normally projecting therefrom in opposite directions, and spring connections supported by the said framework and pivotally connected with the free end portions of the said links, substantially as set forth.

4. In a spring-wheel, the combination, with a rim, and a framework provided with a hub; of a spring arranged with its axis at an angle to the said rim, said spring being carried by the said framework, and a connection bearing against each end of the said spring and pivotally connected with the rim, substantially as set forth.

5. In a spring-wheel, the combination, with a rim, and a framework provided with a hub; of a link pivoted to the rim and arranged at an angle thereto, a bolt pivoted to the said link, plates normally slidable toward each other on the said bolt and bearing against portions of the said framework, and a helical spring arranged between the said plates, substantially as set forth.

6. In a spring-wheel, the combination, with a rim, and a framework provided with a hub and four cylinders, the axes of the adjacent cylinders being arranged at substantially a right angle to each other; of bolts arranged on the axes of the said cylinders and pivotally connected with the rim, plates normally slidable toward each other on the said bolts and bearing against the ends of the said cylinders, and helical springs arranged between the said plates, substantially as set forth.

In testimony whereof I affix my signature in presence of two witnesses.

GUSTAF ARVID ANDERSON.

Witnesses:
DANIEL S. BEARD,
J. STOVER PRICE.